(12) United States Patent
Mattsson et al.

(10) Patent No.: US 9,913,163 B2
(45) Date of Patent: Mar. 6, 2018

(54) UE CONTROL OF DOWNLINK DATA

(75) Inventors: Ulf Mattsson, Kungsbacka (SE); Björn Bodén, Sunne (SE)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 135 days.

(21) Appl. No.: 14/358,751

(22) PCT Filed: Nov. 16, 2011

(86) PCT No.: PCT/EP2011/070227
§ 371 (c)(1),
(2), (4) Date: May 16, 2014

(87) PCT Pub. No.: WO2013/071964
PCT Pub. Date: May 23, 2013

(65) Prior Publication Data
US 2014/0301194 A1    Oct. 9, 2014

(51) Int. Cl.
*H04W 28/02* (2009.01)
*H04W 76/04* (2009.01)
*H04W 68/00* (2009.01)

(52) U.S. Cl.
CPC ..... *H04W 28/0247* (2013.01); *H04W 76/048* (2013.01); *H04W 68/005* (2013.01)

(58) Field of Classification Search
CPC ........... H04W 76/027; H04W 76/046–76/048; H04W 76/04; H04W 52/0216–52/0219; H04W 88/06; H04W 72/04; H04W 72/1289; Y02B 60/50
See application file for complete search history.

(56) References Cited

U.S. PATENT DOCUMENTS

| | | | |
|---|---|---|---|
| 8,848,608 B1 * | 9/2014 | Addepalli | H04W 4/046 370/328 |
| 9,036,509 B1 * | 5/2015 | Addepalli | H04W 4/046 370/259 |
| 2006/0126582 A1 * | 6/2006 | Saifullah | H04L 12/5692 370/338 |

(Continued)

FOREIGN PATENT DOCUMENTS

| | | |
|---|---|---|
| WO | 2005043860 A1 | 5/2005 |
| WO | 2006061692 A2 | 6/2006 |

*Primary Examiner* — Charles C Jiang
*Assistant Examiner* — Rose Clark
(74) *Attorney, Agent, or Firm* — Rothwell, Figg, Ernst & Manbeck, P.C.

(57) ABSTRACT

The present invention relates to control of downlink data in a packet based telecommunications network and in particular to UE control of downlink data. This is provided in devices and methods for handling such control, for instance a user equipment (101), UE, in a telecommunications network (100). The UE has an associated Internet Protocol, IP, address. The UE comprises at least one processing unit (201), at least one computer readable storage unit (202), at least one communications interface (203), and wherein the processing unit is arranged to execute instructions sets stored in the storage unit for determining that no downlink data is to be received on the communication interface and sending a message using the communication interface to an infrastructure node (103, 104) indicating that no downlink data is to be transferred to the UE.

12 Claims, 4 Drawing Sheets

(56) References Cited

U.S. PATENT DOCUMENTS

| | | | |
|---|---|---|---|
| 2007/0133479 A1* | 6/2007 | Montojo | H04W 52/0216 370/335 |
| 2008/0040481 A1* | 2/2008 | Joshi | G06Q 30/00 709/226 |
| 2010/0142485 A1* | 6/2010 | Lee | H04W 36/02 370/331 |
| 2010/0296441 A1* | 11/2010 | Barkan | H04W 12/08 370/328 |
| 2011/0182193 A1* | 7/2011 | Dwyer | H04W 76/046 370/252 |
| 2011/0185202 A1 | 7/2011 | Black et al. | |
| 2011/0222451 A1 | 9/2011 | Peisa et al. | |
| 2011/0292852 A1* | 12/2011 | Kone | H04W 52/0261 370/311 |
| 2012/0057456 A1* | 3/2012 | Bogatin | H04W 28/08 370/230.1 |
| 2012/0120799 A1* | 5/2012 | Brisebois | H04W 4/001 370/231 |
| 2012/0281561 A1* | 11/2012 | Shukla | H04W 76/068 370/252 |
| 2014/0119255 A1* | 5/2014 | Vannithamby | H04B 15/00 370/311 |
| 2014/0241315 A1* | 8/2014 | Niu | H04L 67/1091 370/331 |
| 2014/0321371 A1* | 10/2014 | Anderson | H04W 76/028 370/329 |

* cited by examiner

UE CONTROL OF DOWNLINK DATA

CROSS REFERENCE TO RELATED APPLICATION(S)

This application is a 35 U.S.C. § 371 National Phase Entry Application from PCT/EP2011/070227 filed on Nov. 16, 2011, the disclosure of which is incorporated by reference.

TECHNICAL FIELD

This invention relates to control of downlink data in a packet based telecommunications network and in particular to UE control of downlink data.

BACKGROUND

Mobile wireless communication in the form of telephony and data connections has become an essential part of our lives and in many ways replaces the fixed connections we have been used to for the past decades. In some parts of the world people and machines is becoming connected with each other only via mobile solutions and not via fixed connections, such as for instance in developing countries but also to some extent in the developed countries.

Usage of wireless telecommunication networks is increasing dramatically over time and the behaviour changes as we shift the volume of traffic from voice to use of data traffic in the telecommunication networks. This is true both for applications requiring access to packet based networks, such as browsers, email communication, cloud based storage, and so on, and for voice related applications as Voice over IP (VoIP) applications. This increase of data traffic sets up demands on the networks to handle large volumes of data traffic and with an always connected situation our devices are always connected to a packet data network, e.g. the Internet connected to different applications. Because of the limited access to wireless infrastructure, cell congestion, device battery life, and similar resource management issues, there is therefore a need for regulating the amount of data traffic in the networks.

In a roaming scenario, i.e. when the user device (UE) is connected to a network of a network operator different from the one that the user has a subscription with, there is also charging issues to be taken into account. The user does not want to get charged for traffic data that the user is aware of or has initiated. The same applies for situations where the user has a subscription where data traffic costs are incurred based on amount of data transferred.

In 2G/3G/4G networks the UE may be provided with an Internet protocol (IP) address for connection to an IP based network and for sending data and receiving data. In such a scenario downlink data will be directed to the UE from any service located on the packet data network connected to the UE even if the UE is active or inactive.

SUMMARY

It is a first object of the invention to remedy or at least alleviate some of these drawbacks. This is provided in a number of aspects in which as first is a user equipment (UE) in a telecommunications network. The UE has an associated Internet Protocol (IP) address. The UE may comprise at least one processing unit, at least one computer readable storage unit, and at least one communications interface. The processing unit may be arranged to execute instructions sets stored in the storage unit for determining that no downlink data is to be received on the communication interface and sending a message using the communication interface to an infrastructure node indicating that no downlink data is to be transferred to the UE.

In some cases the processing unit may further be arranged to execute instruction sets for receiving a paging signal from the infrastructure node and in response to the paging signal sending a message indicating acceptance or no acceptance for receiving downlink data. This has the advantage of being part of a standardized connection process.

Furthermore, the message indicating that no downlink data is to be transferred may be part of a fast dormancy signal which has the advantage of being an existing communication signal and therefore does not require extensive changes to implement. The fast dormancy signal may comprise a flag indicating that no downlink data is to be transferred.

Another aspect of the present invention is provided, a method in a user equipment, UE, in a telecommunications network. The UE has an Internet Protocol, IP, address. The method may comprise steps of determining that no downlink data is to be receive and indicating to an infrastructure node that no downlink data is to be sent.

Yet another aspect of the present invention is provided, an infrastructure node in a telecommunications network. The node may comprise at least one processing unit, at least one computer readable storage unit, and at least one communications interface. The processing unit may be arranged to execute instructions sets stored in the storage unit for receiving an indication from a user equipment, UE, allocated with an Internet protocol, IP, address, indicating that no downlink data is to be sent to the UE and instruction sets for stopping downlink data from being sent to the UE.

Still another aspect of the present invention is provided, a method in an infrastructure node in a telecommunications network. The method may comprise steps of receiving an indication, from a user equipment, UE, allocated with an Internet Protocol address, indicating that no downlink data is to be sent to the UE, and stopping downlink from being sent to the UE.

In this manner the UE will not receive any downlink data and therefore reduce costs incurred for instance in a roaming scenario however retaining the allocated IP address and therefore able to send uplink (UL) data when so wanted.

The UE and/or any external devices may reduce battery energy consumption and thus prolong the life time of the battery between each charging.

Furthermore, with this solution control and data signalling may be reduced in the network thus decreasing the load on the network.

Further advantages of the invention will appear from the following detailed description of the invention.

BRIEF DESCRIPTION OF THE DRAWINGS

In the following the invention will be described in a non-limiting way and in more detail with reference to exemplary embodiments illustrated in the enclosed drawings, in which.

DETAILED DESCRIPTION

Figure 1:
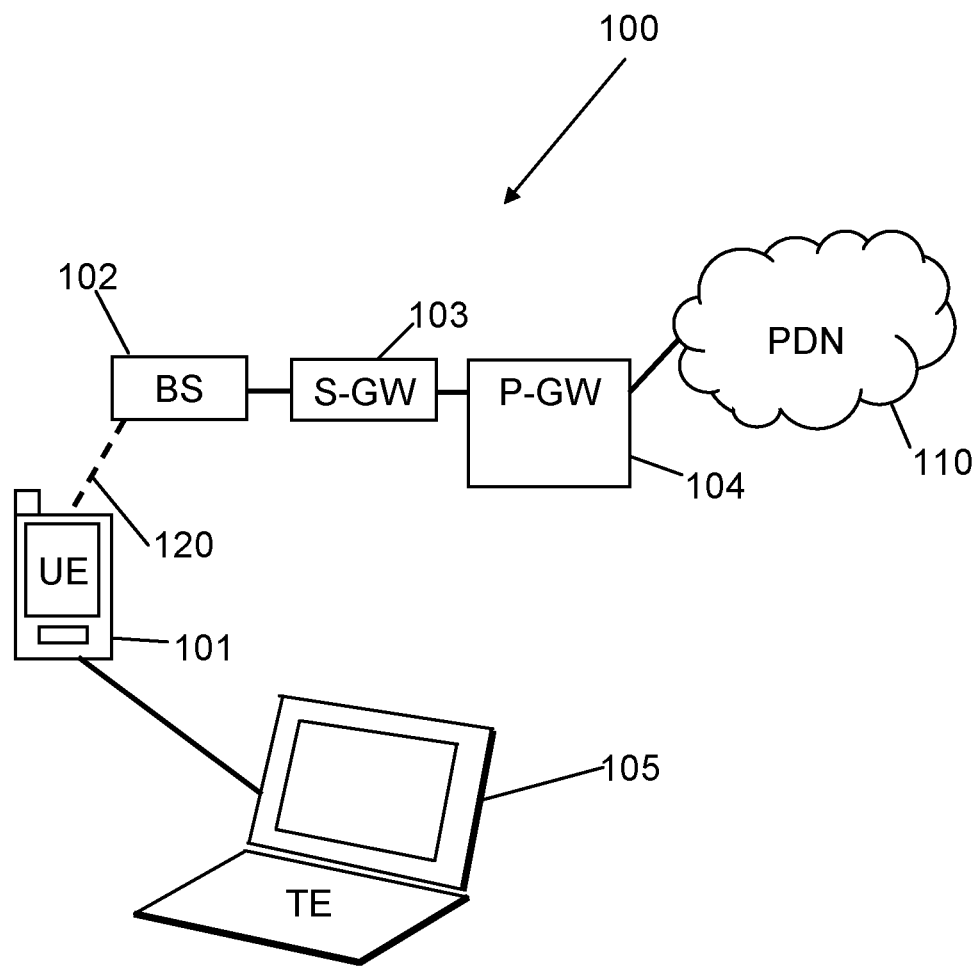
FIG. 1 is a schematic block diagram illustrating a network according to a first embodiment of the present invention.

In FIG. 1 reference numeral 100 indicate a packet based telecommunications infrastructure network according to the invention. A user equipment (UE) 101 communicates via a wireless communication link 120 with a radio access device (BS), e.g. a base station or an eNodeB (eNB) 102 which in turn communicate with the network via a serving gateway (S-GW) 103 or an SGSN and an Internet gateway, e.g. a GGSN or a Packet data network gateway (P-GW) 104. The user equipment may be for instance a terminal, mobile/cellular phone, smart phone, pocket digital assistant (PDA), tablet computer, laptop, or personal computer, or optionally a combination of these, e.g. with a terminal equipment tethered device (TE) such as a laptop 105 communicating via a smart phone 101 with the network. It should be noted that other network elements/nodes may be used in the communication process, for instance routers, switches, network cabling and so on for transporting data and control traffic; furthermore, other logical/physical nodes are involved in the communication process depending on network configuration, such as mobility management node, e.g. a mobility management entity (MME), charging policy and enforcement nodes, subscriber data nodes, location registers, and so on as understood by the person skilled in the art.

Figure 2:
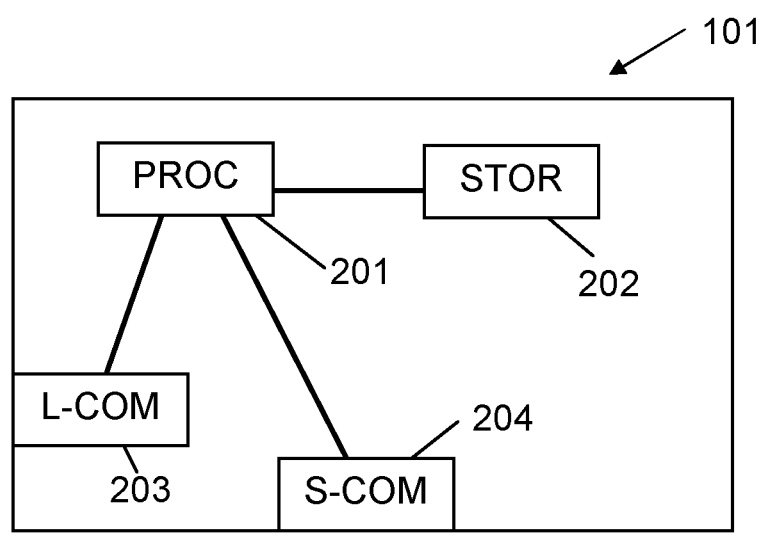
FIG. 2 is a schematic block diagram illustrating a network according to a second embodiment of the present invention.

The UE comprise as is shown in FIG. 2, at least one processing unit (201) (PROC), at least one memory unit 202 (STOR) connected to the processing unit, and at least one long range communication interface 203 (L-COM) and optionally one or more short range communication interface 204 (S-COM) each connected to the processing unit. The L-COM may be of any suitable wireless communication type, such as for instance 2G, 3G, 4G, or a combination of these. The S-COM may be a fixed or wireless communication interface, for instance a USB connection, Wi-Fi connection, or a Bluetooth connection connecting external devices, called tethered devices, such as a laptop as shown in FIG. 2. The processing unit may be of any suitable type, such as a microprocessor, digital signal processor (DSP), application specific integrated circuit (ASIC), a field programmable gate array (FPGA), or combinations of these; for instance in some devices the processing unit comprise two processors working in parallel with different tasks for speeding up the user interface experience, e.g. one processor may handle control and data traffic issues and one processor may be arranged to handle graphical user interface issues. The processing unit is arranged to operate instruction sets stored in the memory unit as software in the memory unit which is a of a computer readable storage medium type. The memory may comprise any suitable type of volatile and/or non-volatile type or combinations of these built in and/or as an external memory card; for instance RAM, flash memory, electrically erasable memory (EEPROM), solid state drive (SSD), hard drive (HD), and so on. The instruction sets handles the communication control and data traffic and also the user interface of the UE and so on. During attachment to the data packet network an IP address is provided to the UE in order to being able to communicate with a data packet network; the attachment procedure may be of any suitable type in relation to type/mode of communication, e.g. 2G, 3G, or 4G network technology and follows standard procedures as defined in respective standardization documentation. 2G or 2.5G may for instance be GSM, GPRS, EDGE, or HSDPA based, 3G may be UMTS, WCDMA, CDMA2000, and 4G may be LTE or WiMAX based.

The UE may be arranged to register on the telecommunications network and receive charging information and with this information decide whether or not to receive downlink data or how often and/or the amount of data to receive.

The UE may optionally be operated to communicate with an external tethered device using the S-COM interface, such as a laptop, and arranged to transfer data between the external device and the base station and the packet data network. The UE may be arranged to detect or determine if the external device has stopped to operate or is not to receive downlink data for some time, e.g. due to being in a sleep mode or being inactive for some time. The UE will in such a situation indicate to an infrastructure device, e.g. the S-GW 103, that no downlink data is to be sent downlink to the UE for the external device. Similarly, the UE may determine that itself has no interest to receive downlink data for some time and may then similarly indicate that no downlink data is to be provided from the data packet network.

The UE may also be arranged to determine that no downlink data is to be received due to other resource management reasons, e.g. battery consumption in the UE or the external device connected to the UE.

Figure 3:
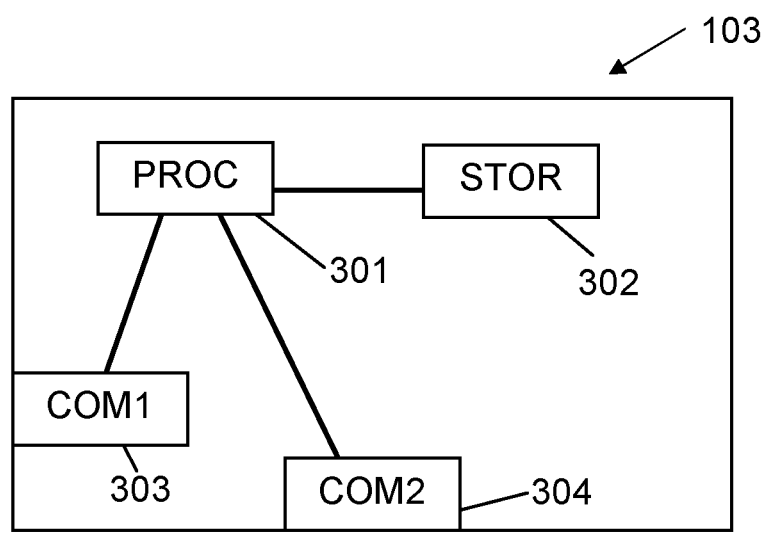
FIG. 3 is a schematic block diagram illustrating an exemplary device according to the present invention.

The S-GW 103 comprise as is shown in FIG. 3, at least one processing unit 301 (PROC), at least one memory unit 302 (STOR) connected to the processing unit, and at least one communication interface 303 and 304 (COM1 and COM2) each connected to the processing unit. The processing unit is arranged to operate instruction sets stored in the memory unit as software in the memory unit which is computer readable. The processing unit is arranged to receive and transmit control and/or data packets using the at least one communication interface. The processing unit is arranged to control data flow within the S-GW between the memory and the communication interfaces and within the processing unit itself depending on functionality operated. The communication interface has been exemplified with two physical interfaces; however, it should be understood that it could be one physical interface or more than two physical interfaces depending on configuration; for example the communication interface may comprise an Ethernet interface or an asynchronous transfer mode (ATM) interface. The processing unit may comprise for instance a micro processor, an application specific integrated circuit (ASIC), digital signal processor (DSP), or field programmable gate array (FPGA). The memory unit may comprise any suitable volatile and/or non-volatile memory in a single unit or as a combination of units, the memory may comprise for instance a solid state memory, e.g. SSD, a random access memory (RAM) of any type, a hard disk (HD), flash memory, and so on. It should be noted that a packet data network gateway basically comprise similar units and interfaces as described above for the S-GW in relation to FIG. 3; however with other instruction sets for operating other types of functionality.

The UE is arranged to determine that no downlink data is to be sent to it, and thus a method handling this is implemented in the UE with corresponding response method in one or several infrastructure nodes as will be discussed below:

The UE is thus arranged to;
Determine that no downlink data is to be sent; this may be due to the user of the UE or an external device connected to the UE is inactive, and indicate in a signalling message to one or several suitable infrastructure nodes, e.g. S-GW or P-GW similar nodes, that downlink data is not to be sent downlink to the UE or the external device connected to the UE.

The infrastructure node may then be arranged to handle this indication in an appropriate manner depending on network configuration and stop downlink data.

In a non roaming scenario the stop downlink data indication may be sent to a serving gateway, for instance an S-GW in a 3/4G network or an SGSN in a 2/2.5G network and the serving gateway is then arranged to stop downlink data traffic. Such an implementation requires a moderate level of amendment to standardizations. For instance, an information element may be added to a suitable control message used between the UE and the infrastructure node, e.g. a DoNotSendDLData or DoSendDLData information element; the Do send DL data information element may be used if or when the UE or the connected external device wants to assume downlink data traffic again, for instance if the user becomes active again.

However, in a roaming scenario the solution where the stop downlink data indication is provided to the serving gateway may still mean that data is sent downlink from a packet data network gateway, e.g. a GGSN for a 2/2.5G and a P-GW for a 3/4G network, and possibly, traffic costs may be incurred on to a communication subscription related to the user or to the UE. Therefore, it is beneficial to control the packet data network gateway due to charging issues, i.e. preferably the serving gateway may signal the packet data network gateway with an indication to stop downlink data traffic associated with the IP number associated with the UE.

Alternatively, the UE may be arranged to send the stop downlink data indication directly to the packet data network gateway, e.g. the P-GW. This may be implemented with several different types of solutions, e.g. in the standardization for respective communication technology type or using signalling via an IPv6 link-local channel that may be available directly between the UE and packet data network gateway—such a solution may be implemented with no or minor effects on 3GPP standards.

Figure 4:
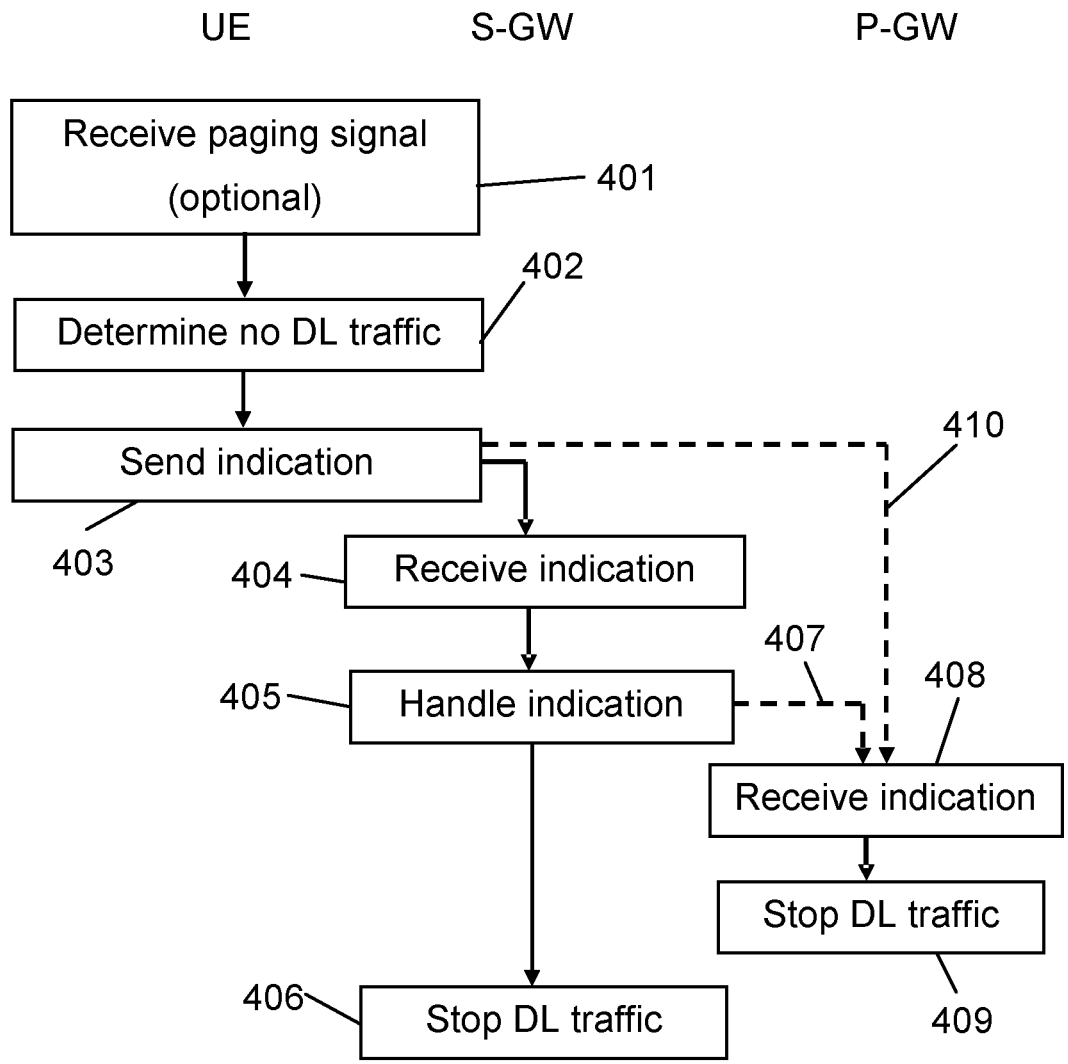
FIG. 4 is a schematic block diagram illustrating a method according to embodiments of the present invention.

These different scenarios and their inter-relations are illustrated in FIG. 4.

401. The UE may optionally receive a paging signal or a similar signal related to connection management of the UE to the network from a serving gateway or similar infrastructure node. This paging signal may comprise charging information and/or other information related to the connection to the network of interest for determining if the UE is of interest to receive downlink data. The processing unit may thus be arranged to execute instruction sets for receiving the paging signal from the infrastructure node and in response to the paging signal send a message indicating acceptance or no acceptance for receiving downlink data as will be discussed below in relation to step 403. The user equipment may send a message indicating that no downlink data is to be transferred and the message indicating that the UE will decline paging requests.

402. The UE determines if downlink data is to be received. This determination may be based in charging information, the status of any external device connected to the UE, the behaviour of the user of the UE, e.g. the user has been inactive for some period of time, battery status of the UE, and so on. For instance if the UE is connected to a roaming network where charges are incurred for data traffic, the UE may decide that no downlink data is to be sent in order to reduce costs, or if the user of the UE has not been active using the UE for a certain time, the UE may determine that there is no interest to receive downlink data.

403. If the UE determines that no downlink data is to be received, the UE sends an indication to an infrastructure node with information that no downlink data is to be sent to the UE. The indication may for instance be an information element in a control data message, such as for instance a fast dormancy signal, e.g. used in a UMTS 3G network. Optionally, the UE may respond to the paging signal indicated in step 401 with a response that it will not receive any DL data.

404. In one of the embodiments the infrastructure node is a serving gateway which receives the indication, and 405. the infrastructure node handles the indication in a suitable manner as will be discussed below in further steps of the method.

406. If the infrastructure node is a serving gateway it may optionally invoke instruction sets for stopping downlink traffic to the UE, and further optionally send an acknowledgement that this will be done; or 407. further optionally, the serving gateway may send an indication that downlink data traffic is to be stopped to a packet data network gateway.

408. The packet data network gateway receives the indication that downlink data is to be stopped; and 409. the packet data network gateway invokes instruction sets for stopping downlink data traffic and for handling charging issues so the user will not be charged for unnecessary costs. This is beneficial for the subscriber since roaming costs or data traffic costs may be reduced in a convenient manner, i.e. at a point of measuring such charge incurred data traffic.

410. In another embodiment, steps 408 to 409 may be invoked by receiving the indication from the UE with information that no downlink data is to be sent to the UE.

In this manner the UE will not receive any downlink data and therefore reduce costs incurred for instance in a roaming scenario however retaining the allocated IP address and therefore able to send uplink (UL) data when so wanted.

The UE and/or any external devices may reduce battery energy consumption and thus prolong the life time of the battery between each charging.

Furthermore, with this solution control and data signalling may be reduced in the network thus decreasing the load on the network.

It should be noted that the instruction sets for handling the present invention may be distributed to related nodes, e.g. the UE and the infrastructure node, as a computer program product distributed on any suitable type of storage media, e.g. a compact disc (CD), a digital video disk (DVD), a flash memory, a hard drive, a solid state disk, and so on, or distributed as a signal in a communication network, e.g. an IP based network connected to the node.

The packet data network gateway, e.g. the P-GW or GGSN, may be arranged with similar units as described in FIG. 3 for the serving gateway, e.g. processing unit, storage unit and so on. FIG. 3 may thus be used for illustrating the packet data network gateway. It should be noted that the packet data network gateway may be located physically in the same unit as the serving gateway.

It should be noted that the word "comprising" does not exclude the presence of other elements or steps than those listed and the words "a" or "an" preceding an element do not exclude the presence of a plurality of such elements. It should further be noted that any reference signs do not limit the scope of the claims, that the invention may be at least in part implemented by means of both hardware and software, and that several "means" or "units" may be represented by the same item of hardware.

The above mentioned and described embodiments are only given as examples and should not be limiting to the present invention. Other solutions, uses, objectives, and functions within the scope of the invention as claimed in the below described patent claims should be apparent for the person skilled in the art.

ABBREVIATIONS

DL Downlink
EDGE Enhanced Data rates for Global Evolution
eNB evolved Node B
GGSN Gateway GPRS Support Node
GPRS General Packet Radio Service
GSM Global System for Mobile Communications
GW Gateway
HeNB GW Home eNode B Gateway
HeNB Home eNode B
HSDPA High Speed Downlink Packet Access
IP Internet Protocol
MME Mobility Management Entity
P-GW PDN Gateway
PCC Policy and Charging Control
PCEF Policy and Charging Enforcement Function
PCRF Policy and Charging Rules Function
S-GW Serving Gateway
SGSN Serving GPRS Support Node
TAU Tracking Area Update
TE Terminal equipment, tethered device
UL Uplink
UMTS Universal Mobile Telecommunications System

The invention claimed is:

1. A user equipment (UE) in a telecommunications network, with an associated Internet Protocol (IP) address, wherein the UE comprises:
   at least one processing unit;
   at least one computer readable storage unit;
   at least one communications interface;
   wherein the processing unit is arranged to execute instructions sets stored in the storage unit for:
   determining whether the UE should transmit to an infrastructure node a message comprising an instruction instructing the infrastructure node to cease sending downlink data to the UE; and
   sending said message comprising the instruction using the communication interface to said infrastructure node as a result of determining that said message comprising the instruction should be transmitted, wherein
   the determination is based on a status of a device tethered to the UE, and
   the processing unit is configured to determine whether the device tethered to the UE is in an idle mode, and
   the processing unit is configured to send said message as a result of determining that the device tethered to the UE is in an idle mode.

2. The user equipment according to claim 1, wherein the message is part of a fast dormancy signal.

3. The user equipment according to claim 2, wherein the fast dormancy signal comprises a flag indicating that no downlink data is to be transferred.

4. The user equipment according to claim 1, wherein the message indicates that the UE will decline paging requests.

5. The user equipment according to claim 1, wherein the user equipment is roaming in an external network.

6. The user equipment according to claim 1, wherein the message is part of an IPv6 link-local channel message.

7. The user equipment according to claim 1, wherein the communication interface is at least one of 2G, 3G, and LTE.

8. The user equipment according to claim 1, wherein the processing unit is further arranged to execute instruction sets for receiving a paging signal from the infrastructure node and in response to the paging signal sending a message indicating acceptance or no acceptance for receiving downlink data.

9. A method in a user equipment (UE) in a telecommunications network, wherein the UE has an associated Internet Protocol (IP) address, the method comprising:
   determining whether the UE should transmit to an infrastructure node a message instructing the infrastructure node to cease sending downlink data to the UE; and
   sending said message to said infrastructure node as a result of determining that said message should be transmitted, wherein
   the determination of whether to transmit the message is based on a status of a device tethered to the UE,
   the step of determining whether to transmit the message comprises determining whether the device tethered to the UE is in an idle mode, and
   the method further comprises transmitting the message to the infrastructure node as a result of determining that the device tethered to the UE is in said idle mode.

10. The method of claim 9, wherein
the infrastructure node is a serving gateway (S-GW) in communication with a radio access device serving a cell in which the UE is located.

11. The method of claim 9, wherein
the S-GW, in response to receiving the message comprising the instruction, transmits to a packet data network gateway (P-GW) an instruction for causing the P-GW to cease transmitting to the S-GW downlink data destined for the UE.

12. The method of claim 9, wherein
the infrastructure node is a packet data network gateway (P-GW) in communication with a serving gateway (S-GW) serving the UE via a radio access device, and
the P-GW, in response to receiving the message, ceases sending to the S-GW downlink data destined for the UE.

* * * * *